Aug. 24, 1926.
R. L. HOLEHOUSE
STUD REMOVER
Filed Dec. 1, 1925
1,597,468
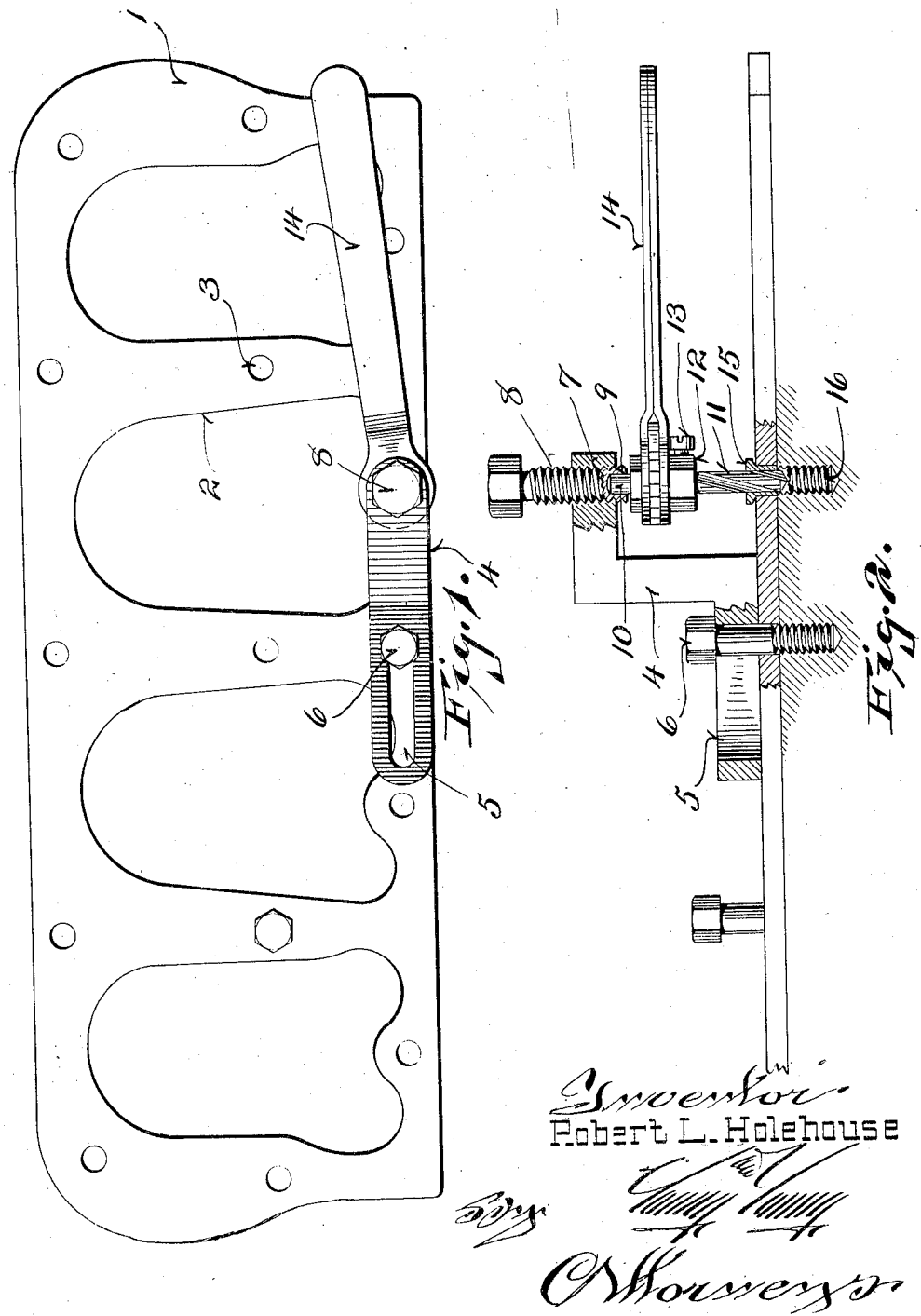
Inventor
Robert L. Holehouse Patented Aug. 24, 1926.

1,597,468

UNITED STATES PATENT OFFICE.

ROBERT L. HOLEHOUSE, OF FRANCIS CREEK, WISCONSIN.

STUD REMOVER.

Application filed December 1, 1925. Serial No. 72,476.

This invention relates to a stud remover and is particularly directed to a stud remover applicable to engine blocks such for example as automobile engines.

Objects of this invention are to provide a device in the nature of a template which may be very quickly attached to the cylinder block by passing the usual cylinder bolts through aligning apertures in the template and block, and which is equipped with means for drilling out and removing the broken stud or bolt in the cylinder head or block, and which is further provided with means for readily operating the drill or similar tool.

Further objects are to provide a stud remover for cylinder blocks in which the holding means for the drill or similar member may be most readily adjusted to operate in any of the bolt holes, and in which the tool may be fed without requiring any effort on the part of the operator to hold the tool against the work.

A further object is to provide means for accurately holding the drill in correct alignment with the broken stud so that there is no danger of injuring or marring the cylinder block.

An embodiment of the invention is shown in the accompanying drawings, in which:—

Figure 1 is a plan view of the device.

Figure 2 is an elevation with parts broken away showing a portion of the apparatus and associated block in section.

Referring to the drawings, it will be seen that the device comprises a template 1 provided with a plurality of cutouts 2 registering with the cylinders and associated openings in the block and also with a plurality of holes 3 registering with the bolt holes in the cylinder block. This template is adapted to be bolted down securely to the top of the cylinder block.

A tool holding bracket 4 is provided and is equipped with an elongated slot 5 in its base portion through which one of the bolts, for instance as indicated at 6, passes and clamps the bracket to the template. The upper portion of this bracket 4 is provided with an overhanging part equipped with a threaded aperture 7 through which a threaded feeding screw 8 passes. This feeding screw is socketed, as indicated at 9, and receives the rounded terminal or upper end 10 of a drill 11. The drill 11 is carried in a hexagonal chuck 12 and is locked in place therein in any suitable manner as by means of a set screw 13. A ratchet wrench 14 engages the chuck and, if desired, may rest upon the set screw, as shown in Figure 2 to hold it in position. Thus in operating the drill, it is merely necessary to rock the arm of the wrench 14 back and forth and to gradually feed the screw downwardly, thus forcing the drill into the work.

It is to be noted that the openings 3 in the template 1 are of a size to permit the free passage therethrough of the studs or bolts of the cylinder block. Preferably a bushing 15 is slipped into one of the apertures through which the drill 11 is intended to work. This bushing accurately guides the drill and holds it in absolute alignment with the axis of the broken portion 16 of the stud which is to be removed.

The drilling proceeds in the usual manner and the stud is removed after it has been drilled out in the usual way.

When it is considered that the studs or bolts are frequently broken off in the cylinder block, it is at once apparent that this device fulfills a long felt want. Further, it is to be noted that it is an extremely difficult, even impossible operation, to manually hold the drilling tool in absolute alignment with the axis of the broken stud and to drill this stud without marring the threaded hole in the cylinder block. From actual practice it has been found that the studs frequently break with a ragged upper end which forces the drill sidewise against any manual grip that may be placed upon the hand drilling tool. However, in practicing this invention, the drill is accurately and positively held in exact alignment with the axis of the stud and although the stud may be broken in a slanting or ragged manner across its upper end, nevertheless, the drill will be prevented from slipping sidewise on the stud and absolute alignment will be maintained.

Although the invention has been described in considerable detail, it is to be understood that the invention may be variously embodied and is, therefore, to be limited only as claimed.

I claim:

A device for removing broken studs from cylinder blocks comprising a template having apertures therethrough whereby it may be bolted to the cylinder block, a bracket adjustably carried by said template, a drill guided through the medium of said bracket at its upper end, means for guiding the lower end of said drill and maintaining it in absolute alignment with the axis of the broken stud, a chuck for holding said drill and means for rotating said chuck, and a feed screw threaded through said bracket and receiving the upper end of said drill.

In testimony that I claim the foregoing I have hereunto set my hand at Francis Creek, in the county of Manitowoc and State of Wisconsin.

ROBERT L. HOLEHOUSE.